July 14, 1925.

F. C. HACHENEY 1,546,232

SPARE TIRE CARRIER AND RIM EXPANDER AND CONTRACTOR

Filed May 19, 1922

Frank C. Hacheney
INVENTOR

WITNESSES
Frank B. Cook
Harry E. Seidel

ATTORNEY

July 14, 1925. 1,546,232
F. C. HACHENEY
SPARE TIRE CARRIER AND RIM EXPANDER AND CONTRACTOR
Filed May 19, 1922 2 Sheets-Sheet 2
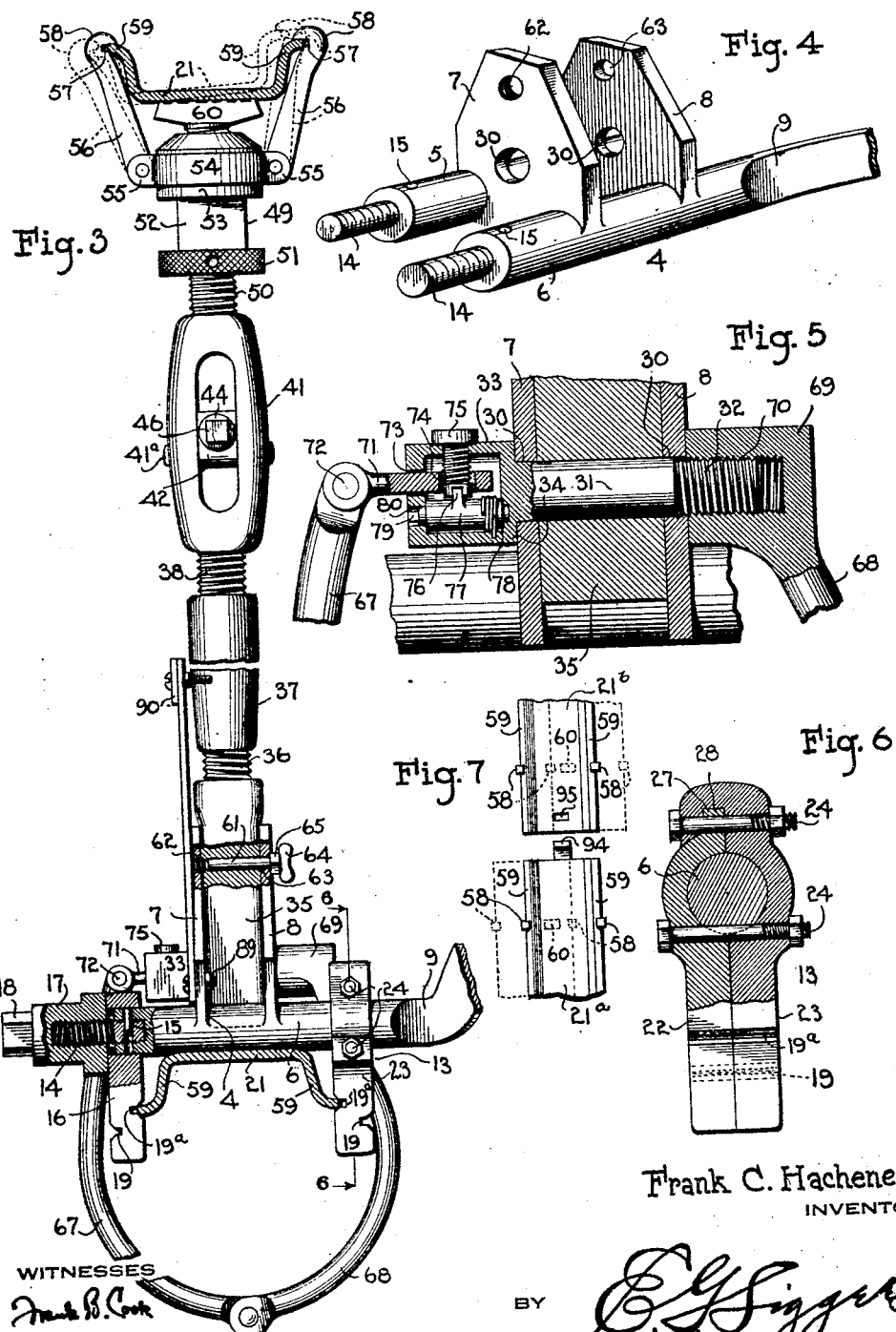
Frank C. Hacheney
INVENTOR Patented July 14, 1925.

1,546,232

UNITED STATES PATENT OFFICE.

FRANK C. HACHENEY, OF JOHN DAY, OREGON, ASSIGNOR OF ONE-THIRD TO HORACE K. JOHNSON AND ONE-THIRD TO IRA G. BOYCE AND CLARA A. BOYCE, ALL OF JOHN DAY, OREGON.

SPARE-TIRE CARRIER AND RIM EXPANDER AND CONTRACTOR.

Application filed May 19, 1922. Serial No. 562,164.

*To all whom it may concern:*

Be it known that I, FRANK C. HACHENEY, a citizen of the United States, residing at John Day, in the county of Grant and State of Oregon, have invented a new and useful Spare-Tire Carrier and Rim Expander and Contractor, of which the following is a specification.

This invention relates to improvements in spare tire carriers adapted to be rigidly secured to an automobile, and has for its object the provision of a tire carrier with means which is capable of adjustment for carrying, contracting or expanding any size or style of demountable split rim.

A further object of the invention is to provide a rim expander or contractor adapted to be positioned on some part of an automobile which is readily accessible to a person while standing, whereby a tire may be very conveniently removed or replaced in a position which is free from the dirt and dust of the roadway.

A further object of the invention is the provision of a device which will not only contract or expand a rim, but which will move the laterally displaced ends of a split distorted rim towards each other whereby the ends will be alined with each other.

The invention contemplates the provision of a base member adapted to be secured to an automobile, with means projecting from said base member for rigidly positioning a rim to be expanded or contracted, and with means pivoted on the base member for expanding or contracting the rim, said base member providing a support for a tire-embracing means to prevent unauthorized removal of the tire or the rim.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:—

Fig. 3 is a side elevation of the rim expanding and contracting means of the tire carrier with parts in section.

Fig. 4 is a view in perspective of the base supporting member of the tire carrier.

Fig. 5 is an enlarged detail view in section disclosing the manner of locking a tire embracing means on the base member to prevent unauthorized removal of the tire or rim.

Fig. 6 is a vertical section of a removable rim-engaging member, taken along the line 6—6 of Fig. 3.

Fig. 7 is a fragmentary plan view of a portion of a distorted rim with its ends displaced.

Figure 1:
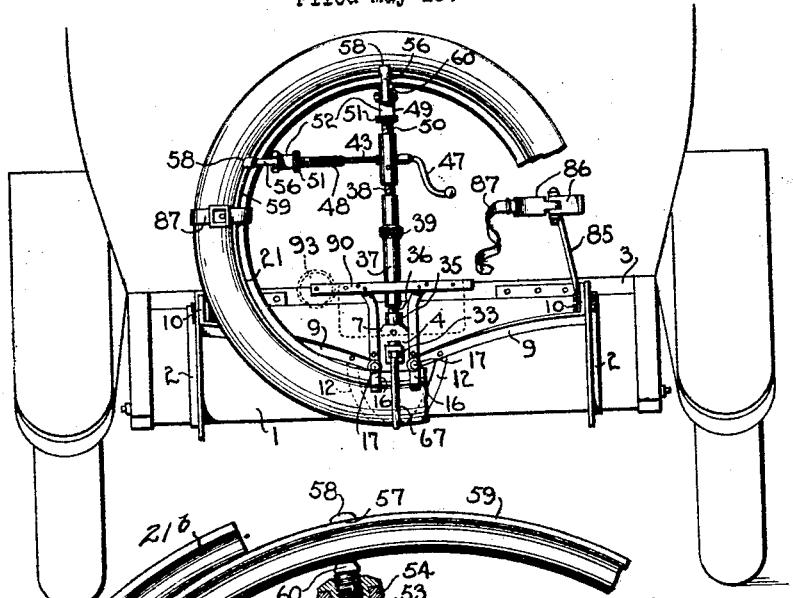
Fig. 1 is a front elevation of my improved tire carrier shown as supporting a rim and tire on the rear of an automobile.

Referring to the drawings, 1 designates a gasoline tank secured by means of spaced angle iron straps 2 to the rear cross bar 3 of the chassis of an automobile.

A base member, designated generally by the numeral 4, comprises a pair of spaced cylindrical rods 5 and 6, connected together transversely and intermediate their ends by a pair of spaced cheek plates 7 and 8. The portions of the rods 5 and 6 to the rear of the plate 8 are flattened and curved coincidently with the transverse curvature of the tank 1, in order that said curved portions may neatly fit the wall of the tank and lie in close engagement therewith. The flattened portions or straps 9 are extended in opposite directions towards the ends of the tank and there bent at right angles, and curved over the tank, said curved portions 10 being secured by means of bolts or rivets to the outstanding flange of the straps 2, which are secured to the chassis. (Fig. 1).

Straps 12 are secured to the flat portions 9 on opposite sides of the base member 4 and are curved downwardly and rearwardly around tank 1 to conform to the curvature of said tank, and then connected together to form a single strap which is secured in any approved manner to some fixed part of the car. While I have shown one specific form of means for connecting the base member 4 to the rear of an automobile, this construction may be greatly varied to conform to various conditions met with in the different types of cars.

On the cylindrical rods 5 and 6, and to the rear of the plate 8, are removably mounted a pair of depending rim supporting and clamping members 13, each of which is made of two sections. Screwed into a threaded bore in the outer ends of the rods 5 and 6 are threaded lugs 14, which are held from turning in said bores by means of pins 15 (Figs. 3 and 4). On the forward ends of the rods 5 and 6 are mounted a pair of rim-engaging and supporting members 16 which cooperate with the rim-supporting and clamping members 13 for rigidly securing a rim in vertical position on the base member 4.

As shown more particularly in Fig. 3, the rim-engaging members 16 are shaped at their upper ends to slip over and receive the cylindrical rods 5 and 6, the members 16 being held in position on said rods by means of stepped cap nuts 17 adapted to be screwed upon the threaded studs 14. The outer reduced portions 18 of the cap nuts are preferably of hexagonal form in order that the same may be readily engaged by a socket wrench for releasing or tightening the nuts.

The rim-supporting members 13 and 16 depend below the rods 5 and 6 and have transverse grooves 19 and 19ª in their opposite faces provided with flared openings or mouths.

The grooves 19ª on the inner adjacent faces of the rim-supporting members are located closer to the base member than the grooves 19, which are located on the exterior faces of the rim-supporting members, in order to compensate for the various depths and sizes of rims. Either of the rim-engaging members 13 or 16 are removable and reversible so that the grooves 19 may be turned inwardly for engaging a rim of greater channel depth than the rim 21 shown in Fig. 3.

Each of the rim-engaging members 13, or clamps, of which a pair is provided, as shown in Fig. 6, comprises a pair of split sections 22 and 23. The sections are joined together by bolts 24 and embrace the rods 5 or 6. The upper end of the section 22 has a vertical rib 27, which is adapted to engage a socket 28 of the section 23, and thus provide an interlocking connection between the sections. By the removal of the nuts from the bolts 24, the sections 22 and 23 of the rim-supporting member 13 may be disconnected, and the members 13 removed from the cylindrical rods 5 and 6, and reversed in position, so that the faces of the members 13 which are provided with the transverse grooves 19 may be placed adjacent to each other. By loosening the bolts 24, the members 13 may be adjusted to any position along the rods 5 and 6.

Substantially midway between the rods 5 and 6, and slightly above the said rods, the plates 7 and 8 are provided with alined perforations 30, through which is adapted to be inserted a pin 31, having its rear end threaded as shown at 32, while its forward or opposite end is provided with an integrally constructed form of lock casing 33, having shoulders 34 adapted to abut the outer face of the cheek plate 7.

Figure 2:
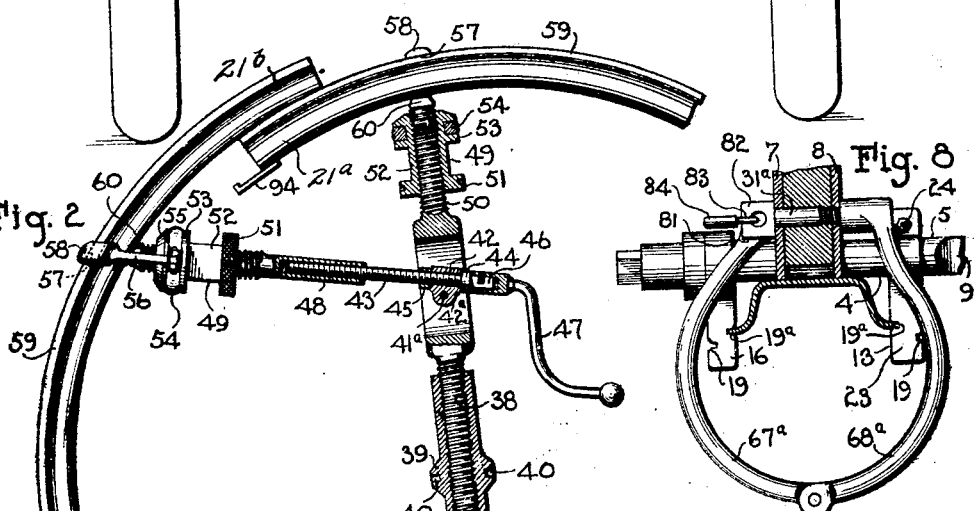
Fig. 2 is a front elevation of the tire carrier disclosed partly in section showing the device in operation for contracting a rim.

Pivotally mounted between the plates 7 and 8, and on the pin 31, is a member 35, having an integrally formed rod 36 at its upper end extending vertically from said member, and provided with left hand screw threads. Upon the upper end of the threaded rod 36 is adapted to be screwed an operating sleeve 37, having an internally threaded bore, the lower portion of the sleeve 37 having its bore provided with internal threads of a construction to engage the left hand threads of the rod 36, while the upper portion of the sleeve is provided with internal threads of the right hand type adapted to engage with the right hand threads on the lower end of an extensible threaded rod, 38, as shown in Figs. 2 and 3.

Midway between the ends of the sleeve 37 is formed an annular knurled enlargement 39 adapted to be gripped by the hand of the operator for rotating said sleeve. Spaced openings 40 are provided in the annular enlargement 39 to receive the end of a tool for likewise causing rotation of the sleeve 37.

Midway of the ends of the extensible rod 38 is formed a loop 41, in which is pivotally mounted a sleeve 42 providing a bearing for one end of a screw-threaded oscillating rod 43. The pivotal connection between the sleeve 42 and the loop 41 comprises a lug 42ª depending from the sleeve and mounted on a pin 41ª which has its ends journaled in the sides of the loop.

The rod 43 is provided with a shoulder 44 adapted to abut one end of the sleeve 42, while a nut 45 screwed on the threaded portion of the rod 43 engages the opposite end of said sleeve for maintaining the rod 43 against lateral movement relative to the sleeve 42. The inner end of the rod 43, adjacent to the shoulder 44, is squared as shown at 46, and is adapted to be received by a squared socket on the end of a crank 47. Mounted on the screw-threaded rod 43 is an extensible hollow arm 48 provided at its inner end with a threaded bore, adapted to receive the screw-threaded portion of the rod 43. The extensible arm 48 projects from one side of the rod 38, while the operating handle 47 is located on the opposite side of the extensible rod 38.

On the ends of the extensible rod 38 and arm 48 are slidably mounted rim-gripping members. Each member is provided with a sleeve 49 having an internally screw-threaded longitudinal bore which is adapted to be screwed onto the threaded end 50 of either the rod 38 or arm 48. The sleeve 49 on the extensible rod 38 and the tire-gripping members are identical in construction with the sleeve and tire gripping members on the end of the extensible arm 48, and therefore a description of one will suffice for both.

The sleeve 49 is provided with an annular knurled collar 51 adapted to be gripped by the hand of the operator for rotating said sleeve. The rotatable sleeve is likewise provided with a squared portion 52, which is adapted to be gripped by some suitable tool for rotating the sleeve when the operator has not sufficient strength in his hands to draw the rim gripping members tightly for his purpose. On the upper end of the sleeve 49, and adjacent to the squared portion 52, is provided a circular enlargement 53 having an annular groove in which is swiveled an annular collar 54. At diametrically opposite points on the collar 54 are formed spaced ears 55, between which are pivotally mounted rim-gripping elements or claws 56. The outer ends of the rim-gripping elements 56 are provided with grooves 57 formed below an inturned hook-like member 58, as shown in Fig. 3.

Due to the angle at which the extensible arm 48 is ordinarily located, and which is substantially at right angles to the extensible rod 38, as shown in Fig. 2, the grooves 57 of the rim-gripping elements 56 on said arm, are inclined at an angle to the vertical and curved slightly to conform to the peripheral edge on the flange 59 of the rim 21. By reason of the swiveling of the claws 56 in the collar 54, the claws are rotatable independently of said sleeves, while the sleeves are movable along the threaded ends 50 of the extensible rod 38 and arm 48.

As shown in Figs. 2 and 3, the upper ends of the extensible rod 38 and arm 48 terminate in a rectangular-shaped abutment 60 having its outer surface, which engages the bottom of the rim, roughened to prevent slippage, when the rim is firmly held between the gripping elements 56 and the abutment 60 of the extensible rod 38 and arm 48. The abutments 60 support the rim at points along the rim.

In order to lock the extensible rod 38 in a vertical position, when the device is used as a spare tire-carrier, a bolt 61 is passed through alined perforations 62 and 63, in the upper ends of the plates 7 and 8, respectively, and through a transverse passage in the upper end of the pivoted member 35. The bolt is provided at one end with a threaded portion adapted to engage the threaded perforation 62 of the plate 7, and at its other end with a thumb hold 64. A polygonal portion 65 is formed on the bolt 61 between the thumb hold 64 and the plate 8, which may be gripped by any suitable tool for more securely fastening the bolt 61 in position.

In order to secure a tire mounted on the rim 21 against unauthorized removal, I have provided a locking device formed of two hinged sections 67 and 68. One end of the hinged section 68 is provided with a boss 69 having an internally threaded socket 70, into which is adapted to be screwed the threaded end 32 of the pin 31. The outer free end of the section 67 of the locking strap is provided with a link 71, pivotally mounted at 72 on the end of said section and adapted to be inserted through a slot 73 of the lock casing 33. The link 71 is provided with a perforation 74 into which is adapted to be screwed a threaded keeper 75 for maintaining the link within the lock casing. The threaded keeper 75 is screwed into a threaded perforation in the top of the lock casing. In order to prevent unauthorized removal of the keeper 75, the inner end of said keeper is slotted for the reception of a lug 76 projecting from the side of a rotatable barrel 77. The barrel 77 has its ends reduced and journaled in the front and rear sides of the lock casing 33. A spring 78, coiled around the barrel, and having one end secured to said barrel with its other end connected to the base of the casing 33, tends to rotate the barrel in one direction and maintain the lug 76 within the slot in the lower end of the keeper. The reduced outer end of the barrel 77 is provided with a squared portion 79 projecting within an opening 80 in the front wall of the casing 33, and is adapted to be engaged by a key for rotating the barrel 77 in a direction to release the lug 76 from the slot in the end of the keeper 75, whereby said keeper may be screwed outwardly and released from its engagement with the link 71 to permit the section 67 of the strap to be swung rearwardly for releasing the tire.

When the link 71 has been released from the keeper 75 of the lock, the lock casing 33 may be rotated to unscrew the threaded end 32 of the pin 31 from the boss 69, whereupon the locking strap may be entirely removed from its locking position with a tire. The pin 31 need not be entirely removed from its position on the plates 7 and 8, in order to release the strap, since it is only necessary to rotate the pin sufficiently to release the boss 69 from the end of the pin, so that the member 35 will not become disengaged from its position between the plates 7 and 8.

Figure 8:
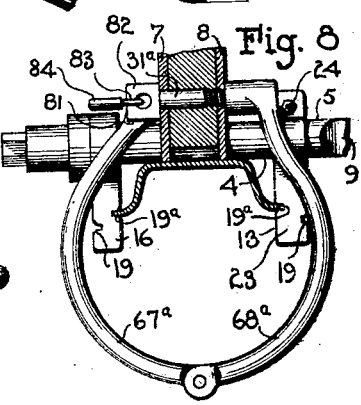
Fig. 8 is a side view in detail of the base member with a modified form of locking means for the tire.

Instead of the construction shown in Fig. 5, the locking means may take the form disclosed by Fig. 8. In this modification, the strap 67ª is flattened and perforated at its outer free end 81, while the pin 31ª is provided at one end with perforated ears 82, between which the flattened perforated end 81 of the strap 67ª is adapted to be positioned, so that the perforation in the end 81 and the perforations in the ears 82 will be alined to receive the shackle 83 of a padlock 84. The other parts of the strap 67ª and the pin 31ª are of similar construction to the related parts of the strap 67 and the pin 31 of Fig. 5.

As shown in Fig. 1, upstanding bracket arms 85 are secured at their lower ends by the bolts or rivets, which connect the portion 10 of the strap 9 to the outstanding flange of the angle iron straps 2. On the upper ends of the arms 85 are pivotally mounted hinged tire-embracing members 86, adapted to partially surround the tire and have their free ends secured together by means of leather straps 87. These tire-embracing members 86 are used in connection with the device when the same is employed as a tire carrier.

In order to support a license plate in a position which will not interfere with the operation of the tire carrier at any time, I have secured a bracket comprising vertical members 88 secured at 89 to the plate 7, and supporting a transverse bar 90 in front of the extensible rod 38, the horizontal bar 90 being provided with the usual perforations 91 for the reception of bolts for securing the license plate in position on the bracket. Upon the extremity of the horizontal bar 90 and to the left of the rod 38 is provided a perforation 92 which is adapted to receive some form of means for securing a tail light 93 in position.

When the device is employed as a tire carrier, the rim supporting members 13 are adjusted along the rods 5 and 6, after the bolts 24 have been loosened. After the proper spacing of the pairs of rim-engaging and clamping members 13 and 16 has been determined, the bolts 24 are tightened to lock the members 13 in position.

The oppositely-disposed edges of the rim flanges are seated in one of the pairs of the V-shaped grooves 19, or 19ª, as the case may be, provided in the opposite faces of the rim-supporting members 13 and 16. The cap nuts 17 are then tightened, causing the edges of the rim to be gripped by the members 13 and 16, whereby the rim and tire are firmly mounted in position with a portion of the rim and tire suspended below the base member 4.

The pin 61, as shown in Fig. 3, is inserted through the slots 62 and 63 of the plates 7 and 8, respectively, and through the passage in the member 35, and screwed up tight to lock the extensible rod 38 in a vertical position. The sleeve 37 is rotated, either by means of a suitable tool engaging the perforations 40 on the knurled enlargement 39, or the sleeve may be rotated by hand through the knurled enlargement 39 to cause the rod 38 to be extended vertically upward until the saddle or rim-engaging part 60 is firmly engaged with the base of the rim. The claws 56 are moved into position on opposite sides of the rim, so that the grooves 57 will engage the peripheral edges of the flanges of the rim. The sleeve 49 is then rotated on the threaded portion 50 of the extensible rod 38 and moved downwardly until the claws 56 are firmly clinched on the rim. Any suitable tool may be adapted to engage the squared portion 52 of the sleeve 49, whereby the gripping element on the end of the arm 38 will be rigidly clamped to the rim.

The extensible arm 48 is moved to the left at substantially right angles to the rod 38 by rotating the crank 47 until the saddle or rim-engaging member 60 of said arm firmly engages the base of the rim. The claws 56 are moved into position so that the peripheral edges of the rim will be engaged within the slots 57 of the claws, or substantially engaged by them, when the sleeve 49 is rotated to cause the said sleeve to move inwardly on the threaded portion 50 of the arm 48 and cause the claws to clamp the rim between the hooks 58 of said clamp elements and the saddle 60. A suitable tool may be used for gripping the squared portion 52 to rotate the sleeve 49 for more rigidly clamping the rim in the gripping member.

In order to remove the tire from the rim 21, the locking pin 61 is removed whereby the extensible rod 38 may oscillate in the vertical plane of the rim, and the sleeve 37 rotated in a manner to cause the extensible rod 38 to be moved towards the base member 4, as shown in Fig. 2, whereby one end of the split rim engaged by said rod will be moved inwardly and break said rim, releasing lug 94 on the end 21ª of the rim from the slot 95 in the other end 21ᵇ of said rim.

The crank arm 47 may be rotated in a manner to draw the end 21ᵇ of the rim held by the arm 48 inwardly and thereby retract the rim so that the tire may be released. In replacing a tire, the same may be positioned on the disposed rim, shown in Fig. 2, when the crank 47 will be rotated in a direction to extend the arm 48 and move the end 21ᵇ of the rim engaged by said arm away from the other portion 21ª of the rim. The sleeve 37 is then rotated to extend the rod 38 and cause the end 21ª to be moved outwardly and towards the free end 21ᵇ of the rim. When the edges of the portion 21ª and 21ᵇ are in alinement, the hook 94 will snap in position within the socket 95 of the end 21ᵇ of the rim.

It frequently happens that a rim is distorted and the ends 21ª and 21ᵇ are out of alinement, and unless some means are provided for shifting the ends laterally, it will be impossible to cause the lug 94 to engage its respective socket 95, as shown in Fig. 7. When the ends of the rims are laterally displaced, as shown in dotted lines of this figure, the saddle 60 of the extensible arm 48 is moved away from the center of the rim and towards the side edge, after the arm 48 has been properly extended to cause the member 60 to engage the base of that portion of the rim, designated by 21ᵇ. The claws 56 are moved in position to hook over the ends of the flanges, when the rotatable sleeve 49 is actuated to cause the distorted end 21ᵇ to be clamped between the member 60 and the hooks 58 of said claws. The end of the rim 21ª is shifted to such a position that the saddle 60 of the extensible arm 38 will engage the opposite side edge of the end 21ª. The rotatable sleeve 49 is then actuated to cause the hooks 58 of the claws 56 to firmly bind that portion of the rim on the saddle 60. When the rim-clamping members have been so positioned, the ends 21ª and 21ᵇ of the distorted rim will be shifted in alinement with each other, as shown in full lines in Fig. 7, after which the crank 47 and the sleeve 37 may be actuated to cause the extensible arms to draw the split ends of the rims together whereby the hook 94 will snap into place within the socket 95.

When so desired, the pin 31 which supports the extensible rod 38 in pivotal relation on the base member 4, may be entirely removed and the extensible rod with its attached elements may be employed as a jack for any useful purpose.

While the invention has been described as a combination spare tire carrier, rim expander and contractor, and it is the combination of these elements which contributes to its utility, at the same time, it is within the scope of my invention to mount the device on a wall or a table, in a garage. It would necessitate no change in the construction other than securing the curved portions 10 of the straps 9 to the wall, instead of to the chassis of an automobile as herein disclosed.

What is claimed is:—

1. In a device of the class described, the combination with a base member, means thereon for securing it to a fixed support, clamping devices depending from the base member to engage opposite edges of a split rim at a point remote from the split portion of the rim, means also connected to the base member for embracing and locking a tire against unauthorized removal, and means pivoted on the base member and normally extensible in different directions for engaging the rim at points on opposite sides of the split portion of the rim.

2. In a device of the class described, the combination with a base member adapted to be secured to a fixed support, of means for securing a split rim in position on the base member with the rim below the base member and held at a point remote from the split portion of the rim, an extensible rod pivoted on the base member and normally in line with the securing means, and an extensible arm pivoted on the rod and arranged at an angle thereto, said rod and said arm being provided with means adapted to grip the rim at points on opposite sides of said split portion and means adapted to extend or retract said rod and said arm for expanding or contracting the rim.

3. In a device of the class described, the combination with a base member adapted to be secured to a fixed support, of means for securing a split rim in position on the base member at a point remote from the split portion of the rim, an extensible rod pivoted on the base member adapted to grip and support a portion of the rim, an extensible arm arranged at an angle to the rod and adapted to grip and support another portion of the rim, an operating means pivotally mounted on the extensible rod and connected with the extensible arm for extending or retracting said arm, means forming a part of the extensible rod for extending or retracting said rod, said extending or retracting means for said rod and said arm adapted to cause the expansion or contraction of the rim.

4. In a device of the class described, the combination with a base member adapted to be secured to a fixed support, of means depending from the base member for rigidly connecting the split rim in position to the base member at a point remote from the split portion of the rim, an extensible rod pivoted on the base member, an oscillatable extensible arm mounted on the rod, both said rod and said arm being provided with means adapted to grip the rim at points on opposite sides of said split portion and cooperating with the first-mentioned securing means for supporting the rim in position, and means on the arm and rod adapted to extend or retract the same for moving the ends of the rim out of circular alinement while the rim is held to the base member.

5. In a device of the class described, the combination with a base member adapted to be secured to a fixed support, of means connected to the base member for securing a split rim in position on the base member at a point opposite its split portion, an extensible rod pivoted on the base member, an extensible arm pivoted on the rod, both said rod and said arm being provided with means adapted to grip the rim at points on opposite sides of said split portion, and means for said rod and said arm adapted to extend or retract the same for expanding or contracting the rim, the gripping means on the arm being shiftable to one side whereby the ends of a distorted split rim may be forced into alinement.

6. In a device of the class described, the combination with a base member adapted to be secured to a fixed support, of means for securing a split rim on the base member at one point of its circumference remote from the split portion of the rim, an extensible rod pivotally mounted on the base member, and an extensible arm pivoted on the rod and adapted to normally lie in the same vertical plane with the rod, the ends of said rod and said arm being provided with means adapted to grip the rim at points on opposite sides of said split portion, and means for said rod and said arm adapted to extend or retract the same for expanding or contracting the rim, the means on said rod and said arm adapted to be shifted on opposite sides of said vertical plane when the rim is distorted, whereby the ends of the rim may be drawn laterally towards each other and alined.

7. In a device of the class described, the combination with a base member adapted to be secured to a fixed support and provided with means for rigidly supporting a split rim substantially vertically and holding the rim at a point remote from the split portion, of an extensible rod pivotally mounted on the base member and provided at its free end with securing means for gripping a rim at one side of said split portion, an extensible arm pivoted on and near the free end of the rod and provided with gripping means for gripping the rim on the other side of said split portion, means on the rod for extending or retracting the gripping means thereon, and means forming the pivotal connection for the arm adapted to be rotated for extending or retracting said arm.

8. In a device of the character described, the combination with a base member adapted to be secured to a fixed support, and provided with means for rigidly securing a split rim to the base member and holding the rim at a point remote from the split portion, of an extensible rod pivotally mounted on the base member provided with means for gripping a portion of the rim, a rotatable means pivotally mounted on the extensible rod, an extensible arm provided with gripping means for gripping another portion of the rim and mounted on said rotatable means and adapted to be extended or retracted when said rotatable means is actuated, and means for extending or retracting the rod and cooperating with the rotatable means for moving the ends of the rim into and out of circular alinement.

9. In a device of the class described, the combination with a base member adapted to be secured to a fixed support and provided with means for rigidly supporting a split rim on the base member, of an extensible rod pivotally mounted on the base member provided with means for gripping a portion of the rim, a rotatable means pivotally mounted on the rod, an extensible arm provided with gripping means for gripping another portion of the rim and mounted on the rotatable means and adapted to be extended or retracted when said rotatable means is actuated, means for extending or retracting the rod and cooperating with the rotatable means for moving the ends of the rim into and out of circular alinement, said arm extending from one side of said rod, and means on said arm for actuating the rotatable means.

10. In a device of the class described, the combination with a base member, of means carried by the base member for rigidly connecting the same to a rim, means also carried by the base member for expanding and contracting the rim, said means comprising extensible and contractible members, each member being provided with an abutment, and a pair of pivoted and rotatably mounted claws for engaging the rim.

11. In a device of the class described, the combination with a base member adapted to be secured to a fixed support, of means for securing a split rim to the base member, an extensible rod pivoted to the base member, and an extensible arm pivoted on the rod, both said rod and said arm being provided with gripping means adapted to grip the rim at points on opposite sides of the split portion of the rim, said gripping means comprising members pivotally and rotatably mounted on the extensible arm and rod.

12. In a device of the class described, the combination with a base member adapted to be secured to a fixed support, of means for securing a split rim to the base member, an extensible rod pivoted to the base member, an extensible arm pivoted on the rod, both said rod and said arm being provided with gripping means adapted to grip the rim at points on opposite sides of the split portion of the rim, said gripping means comprising members pivotally and rotatably mounted on the rod and arm, and means for shifting the gripping means independently of the retraction or extension of said rod and said arm.

13. In a device of the class described, the combination of an extensible member having mounted thereon a rim-gripping member comprising a sleeve provided with an annular knurled collar and a squared portion, an enlargement having an annular groove, an annular collar swiveled in said groove, and pivotally mounted claws carried by said collar, the outer ends of the claws being provided with means to engage the flanged edges of the rim.

14. In a device of the class described, the combination with an extensible element having a screw-threaded part, of a rim gripping member comprising a sleeve having an internally threaded bore adapted to be screwed onto said threaded part, said sleeve being provided with a swiveled annular collar, and a pair of pivoted claws carried by said collar and provided with means to engage the flanged edges of a rim, and an abutment carried by said threaded part beyond said collar and disposed between the claws.

15. In a device of the class described, the combination with a base member adapted to be secured to a fixed support, of means removably mounted on the base member for rigidly securing a split rim in position below the base member, said means comprising a double pair of clamps, means pivoted on the base member between the clamps and normally extensible for supporting the rim at points on the opposite sides of the split portion of the rim.

16. The combination with a base member, comprising a pair of rods and a pair of transverse cheek plates connecting the rods and rising therefrom, split rim contracting and expanding means connected to said plates, a pair of clamps, one pair on each rod outside the plates and depending from said rods, said clamps being provided with grooves for engaging the flanged edges of the rim.

17. The combination with a base member composed of a pair of rods and a pair of spaced plates connecting the rods and rising therefrom, split rim contracting and expanding means connected to said plates, a pair of clamps on each rod for holding a split rim to the base member at a point remote from the split portion of the rim, said clamps being arranged outside the plates and depending from the rods and provided with grooves on opposite sides of the clamps and at different points from the ends thereof for engaging with rims of different depths.

18. The combination with a rigid base member, of means mounted thereon for securing it to a fixed support, means connected to said base member for expanding and contracting a split rim, and means independent of said expanding and contracting means for securing the rim to the base member at a point remote from the split portion of the rim and below the base member, said last-mentioned means comprising two pairs of clamps mounted on and depending from the base member, said clamps each having grooves in both faces to receive the edges of the rim, one of the grooves in each clamp being spaced further from the base member than the other groove.

19. The combination with a base member, comprising a pair of rods and a pair of spaced plates connecting the rods all in one piece, of rim-contracting and expanding means connected to said plates, a pair of clamps mounted on each rod at opposite sides of said plates, said clamps being adapted to engage the edges of a rim held to said base member, one pair of said clamps being each made of one piece and the other pair each formed of two sections, and means for securing said clamps in fixed position on said rods.

20. The combination with a base member comprising a pair of rods, and a pair of spaced plates connecting the rods and formed integral therewith, split rim contracting and expanding means connected to said plates, of a pair of clamps on each rod and depending therefrom, said clamps being constructed to engage the edges of a rim for securing it to the base member below the latter, and means connected to and forming a continuation of said rods for securing the base member to a fixed support.

21. In a device of the class described, a base member comprising spaced rods having means adapted to be secured to a fixed support, means on the rods for engaging a portion of a split rim below the rods at a point remote from the split portion of the rim, a pair of spaced plates rigidly connecting the rods, a rim supporting rod pivotally mounted between the spaced plates and provided with separate means adapted to grip the rims at points on opposite sides of said split portion.

22. In a device of the class described, a base member comprising spaced rods having means adapted to be secured to a fixed support, a pair of spaced plates rigidly connecting the rods together, a split rim supporting means pivotally mounted between the spaced plates and provided with means adapted to grip the rim at points on opposite sides of the split portion of the rim, and means on opposite sides of the plates and removably mounted on the rods for rigidly securing in suspended position below the rods a portion of the rim remote from the split portion thereof.

23. In a device of the class described, a base member adapted to be secured to an automobile, means for rigidly connecting a rim at a portion of its circumference to the base member, an extensible rod pivotally mounted on the base member and provided with gripping means for rigidly securing another portion of a rim in position, the pivotal connection between the base and the extensible rod comprising a bolt threaded at one end, means embracing a tire on the rim to prevent theft of the tire, said bolt adapted to be screwed into one end of the tire embracing means, and means on the other end of the bolt adapted to be locked to the other end of the tire embracing means.

24. In a device of the class described, the combination with a base member adapted to be secured to an automobile, of means for securing a split rim in position on the base member, extensible means having pivotal connection with the base member for supporting the rim at points on opposite sides of the split portion of the rim, and means removably connected to said pivotal connection between the base member and the extensible means whereby unauthorized removal of a tire on the rim is prevented.

25. In a device of the class described, the combination with a base member adapted to be secured to an automobile, of means for securing a split rim to the base member, a pivot pin mounted for rotation on the base member having one end threaded, means pivoted on the pin and provided with securing means for supporting the rim at different points on opposite sides of the split portion, a tire embracing strap provided with an internally threaded perforated socket into which the threaded end of the pivot pin is adapted to be screwed, and a locking means on the other end of the pivot pin and engageable with the free end of the strap for locking the strap against unauthorized removal whereby theft of the tire is prevented.

26. In a device of the class described, the combination with a base member adapted to be secured to an automobile, and provided with means for securing a rim to the base member, of spaced plates rising from the base member, a pivot pin mounted in the plates and provided with a threaded end, means pivoted on the pin between said plates and provided with securing means for engaging the rim at different points, a strap provided with an internally threaded perforated socket into which the threaded end of the pivot pin is adapted to be screwed, said socket being adapted to abut the outer face of one of the plates, and means on the pin projecting beyond the outer face of the other plate and adapted to be locked to the free end of the strap, the strap being adapted to embrace a tire on the rim and then locked in position to prevent unauthorized removal of the tire.

27. The combination with a base member adapted to receive and support a rim, with a tire thereon, of a pin mounted on the base member, a rim and tire embracing strap, and a locking means for the free end of the strap comprising a casing integrally formed on one end of the pin and provided with a slot, the free end of the strap being perforated and insertable within the slot, a keeper adapted to be screwed into the casing and engageable with the perforation in the free end of the strap, and a spring-actuated rotatable barrel provided with a lug and engageable with the keeper to prevent turning of the keeper, said barrel being rotatable by a key for releasing the keeper.

28. The combination with a base member, means provided on the base member for securing the same to an automobile, means also provided on the base member and engaging with a portion of a split rim for securing the rim to the base member at one point of its circumference, rim-expanding and contracting means adapted to engage the rim at points on opposite sides of the split portion of the rim, said expanding and contracting means having a member pivoted to the base member, and means connected to said pivotal connection of said member for holding a tire on the rim against unauthorized removal.

29. The combination with a base member, means provided on the base member for rigidly securing the same to a fixed part of the automobile, means provided on and depending from the base member for engaging the portion of a rim for securing it in place, rim-expanding and contracting means having a member pivoted to the base member, the pivotal connection being extended, and a locking element connected to opposite ends of said pivot, whereby to hold the tire on the rim against unauthorized removal.

30. The combination with a base member, clamping devices connected to and depending from the base member for securing a rim thereto, rim contracting and expanding devices, a pivot pin for pivotally connecting said devices to the base member, said pivot pin having a threaded extension at one end, and a lock casing at the other, and a locking device having a threaded socket to engage the threaded extension of the pivot pin and having means at the other end for engaging with the lock casing.

31. The combination with a base member, clamping devices provided on said base member for engaging with the rim for holding it in position thereto, rim expanding and contracting devices for engaging the rim at different points, a pivotal connection between the base member and said rim expanding and contracting devices, and a locking device for holding an inflated tire in place on the rim, said locking device being connected to said pivot at both ends thereof.

In testimony, that I claim the foregoing as my own, I have hereto affixed my signature.

FRANK C. HACHENEY.